Figure 1:
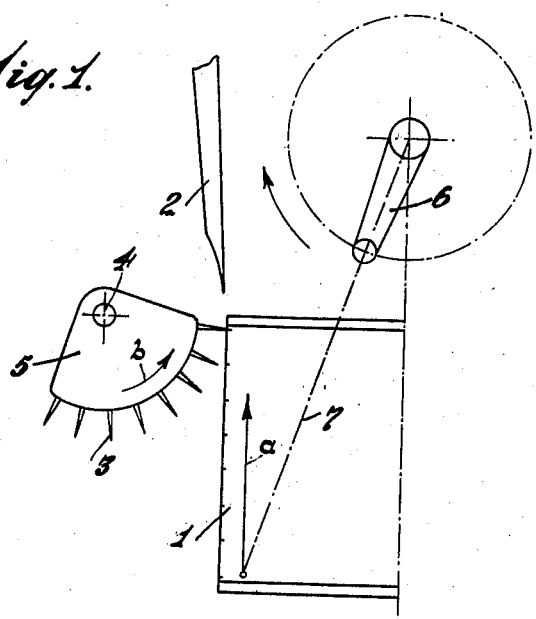

Feb. 24, 1942.　　　A. VAN DUYN　　　2,274,628
SLICING MACHINE
Filed Dec. 2, 1938　　　2 Sheets-Sheet 1

Adrianus van Duyn INVENTOR.

Feb. 24, 1942. A. VAN DUYN 2,274,628
SLICING MACHINE
Filed Dec. 2, 1938 2 Sheets-Sheet 2
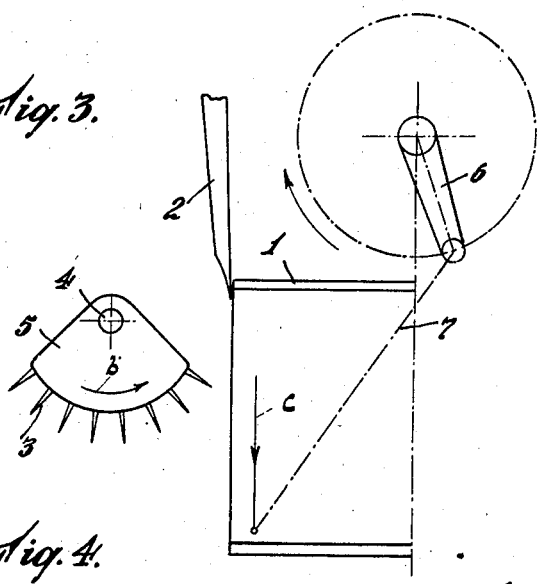
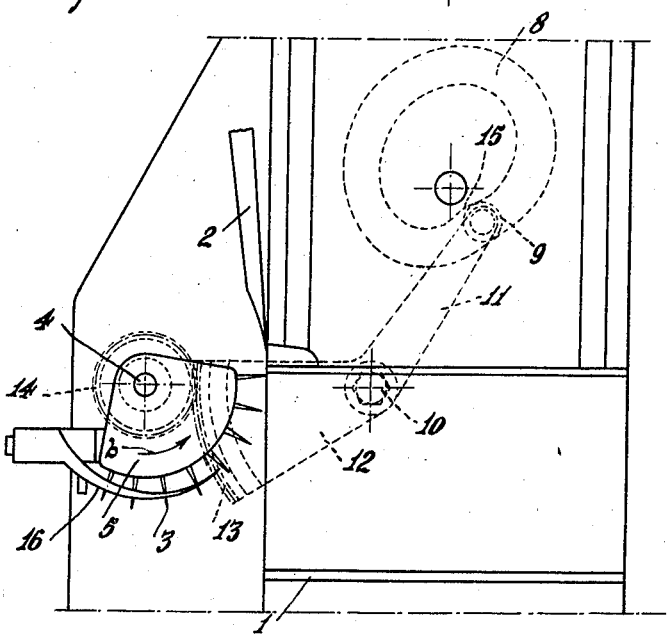
Adrianus van Duyn INVENTOR.
per
ATTORNEY.

Patented Feb. 24, 1942

2,274,628

UNITED STATES PATENT OFFICE 2,274,628

SLICING MACHINE

Adrianus van Duyn, Hillegersberg, Netherlands, assignor to U. S. Slicing Machine Company, La Porte, Ind.

Application December 2, 1938, Serial No. 243,611
In the Netherlands December 9, 1937

7 Claims. (Cl. 146—94)

This invention relates to machines for slicing meat and other edible substances and having slice-stacking mechanism incorporating a slice-conveyer, which rotates to-and-fro in timed relationship with the to-and-fro motion of the substance-supporting carriage of the machine, and a slice-discharging fly which acts to remove successive slices from the conveyer and deposit them upon an appropriate slice-receiver. The fly usually takes the form of a pivotal member into register with which the conveyer returns, after each slice-cutting operation, with the slice for discharge.

An object of this invention is to operate the conveyer in such timed relationship with the carriage that the slice-discharging operation is performed with maximum freedom and without hindrance, even when large slices are to be discharged.

Another object of the invention is to bring the conveyer, for the slice-discharging operation, into a position in which it is comparatively far from the carriage, and thus suitable for said operation, whilst the carriage is still performing its return stroke.

Another object of the invention is to operate the conveyer so that the conveyer leads the carriage in the forward motion of the conveyer towards its slice-taking zone and also in the return of the conveyer towards the slice-discharging position, which the conveyer reaches before the carriage has completed its return movement.

Another object of the invention is to operate the conveyer so that, during a part of the cycle of operations of the machine, the conveyer moves oppositely to the carriage.

Another object of the invention is to operate the conveyer so that it is maintained at rest for a short period during which the slice-discharging operation occurs.

Yet another object of the invention is to control the operation of the conveyer by cam-mechanism including a cam of improved contour.

Other objects of the invention will be apparent from the following description and claims.

Figure 2:
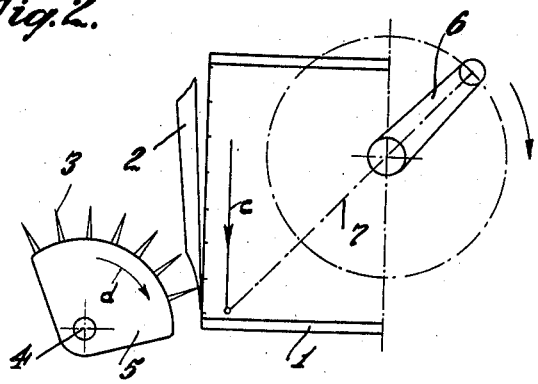

The accompanying drawings illustrate the invention diagrammatically and by way of example. In the drawings:

Figs. 1, 2 and 3 are plan views of certain slicing-machine parts, comprising mainly the substance-supporting carriage, the knife and the slice-conveyer, the respective views showing the carriage and the slice-conveyer in different positions in the cycle of operations of the machine.

Fig. 4 also is a plan view, but in it are shown further slicing-machine parts.

Referring firstly to Figs. 1, 2 and 3, the substance-supporting carriage is denoted by 1, the knife by 2 and the slice-conveyer by 5. As usual, the knife is a disc which rotates in a stationary location. The conveyer 5 is a segmental body, formed with several horizontal rows of slice-impaling prongs 3 and mounted in proximity to the knife on a vertical shaft 4 which receives a to-and-fro rotational or oscillatory motion. Only the top horizontal row of said prongs is shown, the prongs of the lower rows being directly below the prongs shown, so that all the prongs are arranged in vertical rows. The carriage 1 is reciprocated rectilinearly past the conveyer and knife by crank-and-connecting-rod mechanism arranged to give the carriage a slow slicing stroke in the direction of arrow $a$, Fig. 1, and a quick return stroke in the direction of arrow $c$, Fig. 2. The crank is denoted by 6 and the connecting rod is represented by the dot-and-dash central line 7.

Fig. 1 shows the carriage 1 at one end of its range of movement and about to start its slow-speed slicing stroke past the knife, as indicated by arrow $a$. The conveyer is turning in the direction of arrow $b$, the foremost vertical row of prongs 3 advancing into register with the carriage to impale the slice about to be cut by the knife.

Fig. 2 shows the carriage 1 at the opposite end of its range of movement and about to start its quick-speed return stroke, as indicated by arrow $c$. The conveyer 5 is at the end of its slice-taking forward motion, a slice (not shown) being then fully engaged by the prongs 3, and the conveyer is about to start its return motion, in which it brings back the slice, in the direction indicated by arrow $d$.

Fig. 3 shows the conveyer 5 at the end of its return motion, the carriage 1 still being a material distance from its end position (as can be most appreciably seen by comparing the angular positions of the crank 6 in Figs. 3 and 1). The position of the conveyer is such that it faces in a direction exactly parallel to the carriage's return movement; that is, the vertical plane containing the tips of the extreme vertical rows of prongs lies perpendicular to the slicing plane of the knife. It will be manifest that this position of the conveyer is the optimum position for discharging from it the slice which it carries, because in this position there is presented to the pronged face of the conveyer an unobstructed space for the discharge of a slice and the accommodation of a stack of successively discharged slices. For comparison, by referring to Fig. 1, it will be seen that in the position therein shown, the aforesaid vertical plane lies at an acute angle to the line of motion of the carriage and that less space would be available in this position for the discharge and accommodation of slices.

It will also be manifest that the drive of the conveyer desirably ought to be such that the conveyer is brought to rest in its Fig. 3 position for a period during which there will be time for the performance of the slice-discharging operation in an efficient manner. The rest period can be short, and the conveyer may be regarded in Fig. 3 as about to start its slice-taking forward motion in the direction of arrow b. Actually, the conveyer will have started its forward motion whilst the carriage is finishing its return motion in the direction of arrow c. Thus, during the interval between the positions represented by Figs. 3 and 1 respectively, the carriage and the conveyer will move in mutually opposite directions, the carriage returning from the knife and the conveyer advancing towards it.

Referring now to Fig. 4, there is shown therein cam-actuated mechanism for imparting to the conveyer 5 the desired turning motion in relation to the to-and-fro movements of the carriage 1. A cam comprising as its essential constituent a groove-track 8 is mounted on the crankshaft of the aforesaid crank 6 (not shown in Fig. 4). A cam-following roller 9 engaging the track 8 is journalled at one end of the arm 11 of a two-armed lever stationarily fulcrumed at 10 on the machine frame. The other arm 12 of said lever has an arcuate toothed rack 13 which meshes with a pinion gear wheel 14 mounted on the conveyor shaft 4. A so-called slice-discharge fly is denoted by 16, this fly consisting of a series of superposed horizontal fingers adapted to register with the inter-prong spaces of the conveyer when the latter moves into its slice-discharge position (Fig. 3). The fly is pivotable about an axis which is perpendicular to the line of the carriage's movement. The slice-discharging action of the fly consists of a quick downward pivotal motion away from the conveyor in the direction (as viewed in plan) directly opposite to the forward movement of the carriage. The construction and operation of the fly are however well known to those conversant with the art and therefore need not be described further herein.

The contour of the cam-track 8 is so designed that during the portion of the cycle occurring between a stage immediately after the position represented by Fig. 1 and a stage immediately before the position represented by Fig. 2, the speed of the prong tips will harmonise with the speed of the carriage. The cam-track deviates from its general contour in a curve at 15, the deviation being such that the conveyor 5 is maintained for a short period at rest in the slice-discharging position according to Fig. 3. The period is sufficient to permit the fly 16 to take off and discharge the slice unhindered by the conveyer. The cam track inclines, from points at opposite sides of its general contour giving speed harmonising with the carriage speed, towards the rest-producing curve 15 in order to accelerate the conveyer in relation to the carriage and thus ensure that the conveyer will reach the optimum slice-discharge position represented by Fig. 3 and will have time to rest in that position for the discharge operation.

The motion of the conveyer from its rest period relative to that of the carriage, as will be apparent from the foregoing description of the positions according to Figs. 1 to 3, is such that the conveyer leads the carriage, the return of the conveyer not having occupied so long a time as the return of the carriage. Thus it will be seen that in the duration of the carriage's return stroke, the conveyer performs not only the whole of its own return stroke but also a portion of its next forward stroke. In other words, the conveyer turns to a greater extent during the carriage's return stroke than during its slicing stroke.

I claim:

1. A slicing machine comprising a knife, a substance-supporting carriage, crank-and-connecting rod mechanism for moving the carriage rectilinearly forwards past said knife and returning it therefrom, a slice conveyer rotatably mounted in proximity to the knife, and adapted to turn through a slice-taking zone, a conveyer-operating cam rotated unidirectionally in unison with the crank of said mechanism, a cam-lever rocked by said cam, an arcuate toothed member on said cam-lever, a gearwheel meshing with said toothed member and connected to said conveyer, and a slice-discharging fly pivotable in a slice-discharging position about an axis perpendicular to the line of movement of said carriage and adapted to discharge a slice from said conveyer in a direction opposite to the forward movement of the carriage, said cam being designed so that firstly the conveyer leads the carriage in forward motion of the conveyer towards said slice-taking zone, secondly the conveyer continues its forward motion throughout said slice-taking zone at the same speed as the carriage, and thirdly the conveyer leads the carriage in the return of the conveyer towards said slice-discharging position so as to reach said position before the carriage has completed its return movement.

2. A slicing machine comprising a knife, a substance-supporting carriage, crank-and-connecting rod mechanism for moving the carriage rectilinearly forwards past said knife and returning it therefrom, a slice-conveyer rotatably mounted in proximity to the knife, a conveyer-operating cam undirectionally rotated by said mechanism, a cam-lever rocked by said cam, an arcuate toothed member on said cam-lever, a gearwheel meshing with said toothed member and connected to said conveyer, and a slice-discharging fly pivotable about an axis perpendicular to the line of movement of said carirage and adapted to discharge a slice from said conveyer in a direction opposite to the forward movement of the carriage, said cam being designed firstly to turn said conveyer with a forward motion which leads the carriage's forward movement but which occurs at the same speed as the carriage's forward movement throughout the effective slice-cutting action, secondly to return said conveyer to a position wherein it faces a direction parallel to the carriage's return movement with a motion which also leads said return movement, and thirdly to maintain said conveyer at rest in said position for a short period during which said fly can perform its slice-discharging operation.

3. A slicing machine as claimed in claim 1 in which the conveyer-operating cam is also designed to turn the conveyer during a period of the carriage's movement in the direction opposite to such movement.

4. A slicing machine as claimed in claim 1 in which the conveyer-operating cam is also designed to maintain the conveyer at rest during a short period in the slice-discharging position for a slice-discharging operation of said fly.

5. A slicing machine as claimed in claim 10 in which the conveyer-operating cam is also designed to turn the conveyer during a period of the carriage's movement in the direction opposite to such movement.

6. In a slicing machine comprising a rotary knife, a substance-supporting carriage movable past said knife, means for imparting to said carriage a forward movement and a return movement, a slice-cutting action being performed during said forward movement, a conveyer which is movable forwardly in association with said carriage to take therefrom a slice and returnably to convey the slice to a discharge position, slice-engaging projections on said conveyer, and slice-discharging means operable in said position, the combination of a rotatable cam, means for rotating said cam solely in one direction, a cam-groove in said cam, and mechanism connecting said groove to said conveyer and acting to rotate said conveyer positively in both the forward and return directions, said cam-groove being curved to advance said conveyer so that the slice-engaging projections move at the same linear speed as the carriage throughout the slice-cutting action, and said cam-groove being inclined to accelerate the conveyer in its forward movement before the slice-cutting action and in its return movement after said action so that the conveyer is ahead of the carriage when the conveyer reaches the discharge position, and said cam-groove being curved to maintain the conveyer at rest in said position for the discharge operation.

7. A slicing machine of the character described comprising a slicing knife, a substance carriage reciprocal past said knife, means for feeding predetermined thicknesses of slice for cutting by said knife, a rotatably mounted conveyor having slice-taking elements movable between a slice-taking zone and a discharge position, and drive means interconnected with said carriage for moving said conveyor and including a rotatably mounted cam forming a part of said connection, a driving surface on said cam so shaped as to provide for operating said conveyor at different speeds relative to the speed of movement of said carriage to move the conveyer at an accelerated speed with respect to carriage movement during travel of the conveyer towards said slice-taking zone, to move the conveyor at substantially the same linear speed as the carriage during movement in the slice-taking zone, and to move the conveyor at an accelerated speed with respect to carriage movement during return travel of the conveyor to said discharge position, and means operated by said cam surface and drivingly connected to said conveyor for operating the conveyor.

ADRIANUS van DUYN.